US011487787B2

(12) United States Patent
Reddy et al.

(10) Patent No.: US 11,487,787 B2
(45) Date of Patent: Nov. 1, 2022

(54) SYSTEM AND METHOD FOR NEAR-SYNCHRONOUS REPLICATION FOR OBJECT STORE

(71) Applicant: Nutanix, Inc., San Jose, CA (US)

(72) Inventors: Anoop Reddy, San Jose, CA (US); Ajaykrishna Raghavan, Santa Clara, CA (US); Chinmay Dinesh Kamat, San Jose, CA (US); Gowtham Alluri, San Jose, CA (US); Karan Gupta, San Jose, CA (US); Mayur Vijay Sadavarte, Sunnyvale, CA (US); Ravishankar Chandhiramoorthi, Durham, NC (US); Rajkumar Arunkumar Joshi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/943,977

(22) Filed: Jul. 30, 2020

(65) Prior Publication Data
US 2021/0374157 A1     Dec. 2, 2021

Related U.S. Application Data

(60) Provisional application No. 63/039,935, filed on Jun. 16, 2020, provisional application No. 63/032,122, filed on May 29, 2020.

(51) Int. Cl.
*G06F 16/00* (2019.01)
*G06F 16/27* (2019.01)

(52) U.S. Cl.
CPC .......... *G06F 16/273* (2019.01); *G06F 16/275* (2019.01)

(58) Field of Classification Search
CPC ............................ G06F 16/273; G06F 16/275
USPC ................................................... 707/616, 624
See application file for complete search history.

(56) References Cited

U.S. PATENT DOCUMENTS

| 5,802,309 | A  | 9/1998 | Cook et al. |
|-----------|-----|--------|-------------|
| 6,209,128 | B1 | 3/2001 | Gerard et al. |
| 6,775,673 | B2 | 8/2004 | Mahalingam et al. |
| 7,395,279 | B2 | 7/2008 | Iyengar et al. |
| 7,653,668 | B1 | 1/2010 | Shelat et al. |
| 7,685,109 | B1 | 3/2010 | Ransil et al. |

(Continued)

FOREIGN PATENT DOCUMENTS

EP      4 006 737 A1     6/2022

OTHER PUBLICATIONS

"AWS Pricing"; Amazon Web Services; https://aws.amazon.com/pricing/; Webpage accessed on Jun-23-2021; pp. 1-9.

(Continued)

*Primary Examiner* — Chelcie L Daye
(74) *Attorney, Agent, or Firm* — Foley & Lardner LLP

(57) ABSTRACT

An illustrative embodiment disclosed herein is an apparatus including a processor having programmed instructions to detect an operation associated with a first object instance in a first cluster, determine that the first object instance is configured for replication to a second cluster, create an object information (info) metadata entry for the first object instance, create an object replication metadata entry for the first object instance, and simultaneously write the object info metadata entry and the object replication metadata entry to a first data structure and a second data structure, respectively.

23 Claims, 10 Drawing Sheets

(56) References Cited

U.S. PATENT DOCUMENTS

| | | |
|---|---|---|
| 7,721,044 B1 | 5/2010 | Chatterjee et al. |
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,312,027 B2 | 11/2012 | Lamb et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 * | 8/2014 | Marathe ............... G06F 16/907 707/639 |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 * | 2/2016 | Leibowitz ........... G06F 11/1466 |
| 9,336,132 B1 | 5/2016 | Aron et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,120,902 B2 | 11/2018 | Erdogan et al. |
| 10,176,225 B2 | 1/2019 | Naidu et al. |
| 10,296,255 B1 | 5/2019 | Tummala |
| 10,380,078 B1 | 8/2019 | Kumar et al. |
| 10,409,837 B1 | 9/2019 | Schmidt et al. |
| 10,528,262 B1 | 1/2020 | Shmuylovich et al. |
| 10,565,230 B2 * | 2/2020 | Zheng ............... G06F 16/24575 |
| 10,592,495 B1 | 3/2020 | Shami et al. |
| 10,691,464 B1 | 6/2020 | Drego et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 11,099,938 B2 | 8/2021 | Desai et al. |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2004/0186826 A1 | 9/2004 | Choi et al. |
| 2006/0047636 A1 | 3/2006 | Mohania et al. |
| 2006/0080646 A1 | 4/2006 | Aman |
| 2007/0088744 A1 | 4/2007 | Webber et al. |
| 2010/0042673 A1 | 2/2010 | Dayley |
| 2011/0082962 A1 | 4/2011 | Horovitz et al. |
| 2011/0137966 A1 | 6/2011 | Srinivasan et al. |
| 2011/0213884 A1 | 9/2011 | Ferris et al. |
| 2012/0096052 A1 | 4/2012 | Tolia et al. |
| 2012/0096205 A1 | 4/2012 | Velayudhan et al. |
| 2012/0331065 A1 | 12/2012 | Aho et al. |
| 2012/0331243 A1 | 12/2012 | Aho et al. |
| 2013/0054523 A1 * | 2/2013 | Anglin ................ G06F 16/27 707/624 |
| 2013/0198472 A1 | 8/2013 | Fang et al. |
| 2013/0332608 A1 | 12/2013 | Shiga et al. |
| 2014/0279838 A1 | 9/2014 | Tsirogiannis et al. |
| 2014/0379840 A1 | 12/2014 | Dao |
| 2015/0012571 A1 | 1/2015 | Powell et al. |
| 2015/0046586 A1 | 2/2015 | Zhang et al. |
| 2015/0046600 A1 | 2/2015 | Kim |
| 2015/0254325 A1 | 9/2015 | Stringham |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0117226 A1 | 4/2016 | Hetrick et al. |
| 2016/0207673 A1 | 7/2016 | Shlonsky et al. |
| 2016/0275125 A1 | 9/2016 | Drobychev et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0213175 A1 | 7/2019 | Kong et al. |
| 2019/0213179 A1 | 7/2019 | McHugh et al. |
| 2019/0227713 A1 | 7/2019 | Parthasarathy |
| 2019/0324874 A1 | 10/2019 | Gill et al. |
| 2019/0354544 A1 | 11/2019 | Hertz et al. |
| 2019/0370362 A1 | 12/2019 | Mainali et al. |
| 2019/0384678 A1 | 12/2019 | Samprathi et al. |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |
| 2020/0195743 A1 | 6/2020 | Jiang et al. |
| 2020/0201724 A1 | 6/2020 | Saito |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |

OTHER PUBLICATIONS

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"IT Service Provider Technology Solutions and Services"; HPE—Hewlett HacKara; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

(56) References Cited

OTHER PUBLICATIONS

"Storage Tiering"; VMWARE DOCS; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.
B+ Tree Indexes. http://web.csulb.edu/-amonge/classes/common/db/B TreeIndexes.html, Aug. 4, 2018, pp. 1-7 (2018).
Stopford. Log Structured Merge Trees, http://www.benstopford.com/2015/02/14/ log-structured-merge-trees, 2015, pp. 1-8 (2015).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
"Adding Objects to Versioning—Enabled Buckets", from https://docs.aws.amazon.com/AmazonS3/latest/dev/AddingObjectstoVersioningEnabledBuckets.html, (Oct. 2, 2019).
"Configure a Pod to Use a ConfigMap", from https://kubernetes.io/docs/tasks/configure-pod-container/configure-pod-configmap/, (Oct. 2, 2019).
"Deployments", from https://kubernetes.io/docs/concepts/workloads/controllers/deployment/, (Oct. 2, 2019).
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"Volumes", from https://kubernetes.io/docs/concepts/storage/volumes/, (Oct. 2, 2019).
Cano, Ignacio, et al. "Curator: Self-Managing Storage for Enterprise Clusters" (Mar. 27, 2017), from https://www.usenix.org/conference/nsdi17/.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.
"Method:disks.get|Compute Engine Documentation|Google Cloud.pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"PUT Object|Cloud Storage|Google Cloud," https://cloud.google.com/storage/docs/xml-api/put-object, pp. 1-3.
"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"XML and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
Back to Basics_Writing SQL Queries.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.
Howto use Indexing to Improve Database Queries.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.

(56) References Cited

OTHER PUBLICATIONS

Oracle Multimedia User's Guide, 12c Release 1 (12.1), E17697-09 Jul. 2014 (Year 2014).

Oracle SQL Developer User's Guide, Release 1.5, E12152-08, Jul. 2014 (Year: 2014); pp. 1-128.

Patel Kiran, Goynes Eddie, "Lower latency with AWS Elemental Mediastore chunked object transfer|AWS Media Blog," (Jul. 2, 2019), https://aws.amazon.com/blogs/media/lower-latency-with-aws-elemental-mediastore-chunked-object-transfer/, pp. 1-6.

Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.

Sonobuoy, "Sonobuoy," https://sonobuoy.io/, 1-6 pages.

VM ware, "VMware Cloud Director Object Storage Extension Documentation.pdf," https://docs.vmware.com/en/VMware-Cloud-Director-Object-Storage-Extension/index.html, pp. 1-3.

VMware, "Introducing HCX Enterprise—Cloud Blog—VMware," (Aug. 8, 2019), https://blogs.vmware.com/cloud/2019/08/08/introducing-hcx-enterprise/, pp. 1-6.

VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.

VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.

Wikipedia, "Chunked transfer encoding," https://en.wikipedia.org/wiki/Chunked_transfer_encoding, pp. 1-4/.

Woodward Liz, "What Is Elastic Cloud Storage—A Guide to ECS in 2022," https://www.cloudwards.net/what-is-elastic-cloud-storage/, pp. 1-8.

Wambler, Choosing a Primary Key: Natural or Surrogate? http://www.agiledata.org/essays/keys.html, 2018, pp. 1-4 (2018).

Foreign Search Report on EP 21210465.7 dated Apr. 14, 2022.

Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.

\* cited by examiner

US 11,487,787 B2

SYSTEM AND METHOD FOR NEAR-SYNCHRONOUS REPLICATION FOR OBJECT STORE

CROSS-REFERENCE TO RELATED APPLICATION

This application is related and claims priority under 35 U.S. § 119(e) to U.S. Provisional Patent Application No. 63/039,935, filed Jun. 16, 2020, titled "SYSTEM AND METHOD FOR NEAR-SYNCHRONOUS REPLICATION FOR OBJECT STORE," and the U.S. Provisional Patent Application No. 63/032,122, filed May 29, 2020, titled "SYSTEM AND METHOD FOR MULTI-CLUSTER STORAGE," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for near-synchronous replication for object store.

An illustrative embodiment disclosed herein is an apparatus including a processor having programmed instructions to detect an operation associated with a first object instance in a first cluster, determine that the first object instance is configured for replication to a second cluster, create an object information (info) metadata entry for the first object instance, create an object replication metadata entry for the first object instance, and simultaneously write the object info metadata entry and the object replication metadata entry to a first data structure and a second data structure, respectively.

Another illustrative embodiment disclosed herein is an apparatus including a non-transitory computer readable storage medium including instructions stored thereon, when executed by a processor, cause the processor to detect an operation associated with a first object instance in a first cluster, determine that the first object instance is configured for replication to a second cluster, create an object information (info) metadata entry for the first object instance, create an object replication metadata entry for the first object instance, and simultaneously write the object info metadata entry and the object replication metadata entry to a first data structure and a second data structure, respectively.

Another illustrative embodiment disclosed herein is an apparatus including a computer-implemented method including detecting, by a processor, an operation associated with a first object instance in a first cluster, determining, by the processor, that the first object instance is configured for replication to a second cluster, creating, by the processor, an object information (info) metadata entry for the first object instance, creating, by the processor, an object replication metadata entry for the first object instance, and simultaneously writing, by the processor, the object info metadata entry and the object replication metadata entry to a first data structure and a second data structure, respectively.

Further details of aspects, objects, and advantages of the disclosure are described below in the detailed description, drawings, and claims. Both the foregoing general description and the following detailed description are exemplary and explanatory, and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
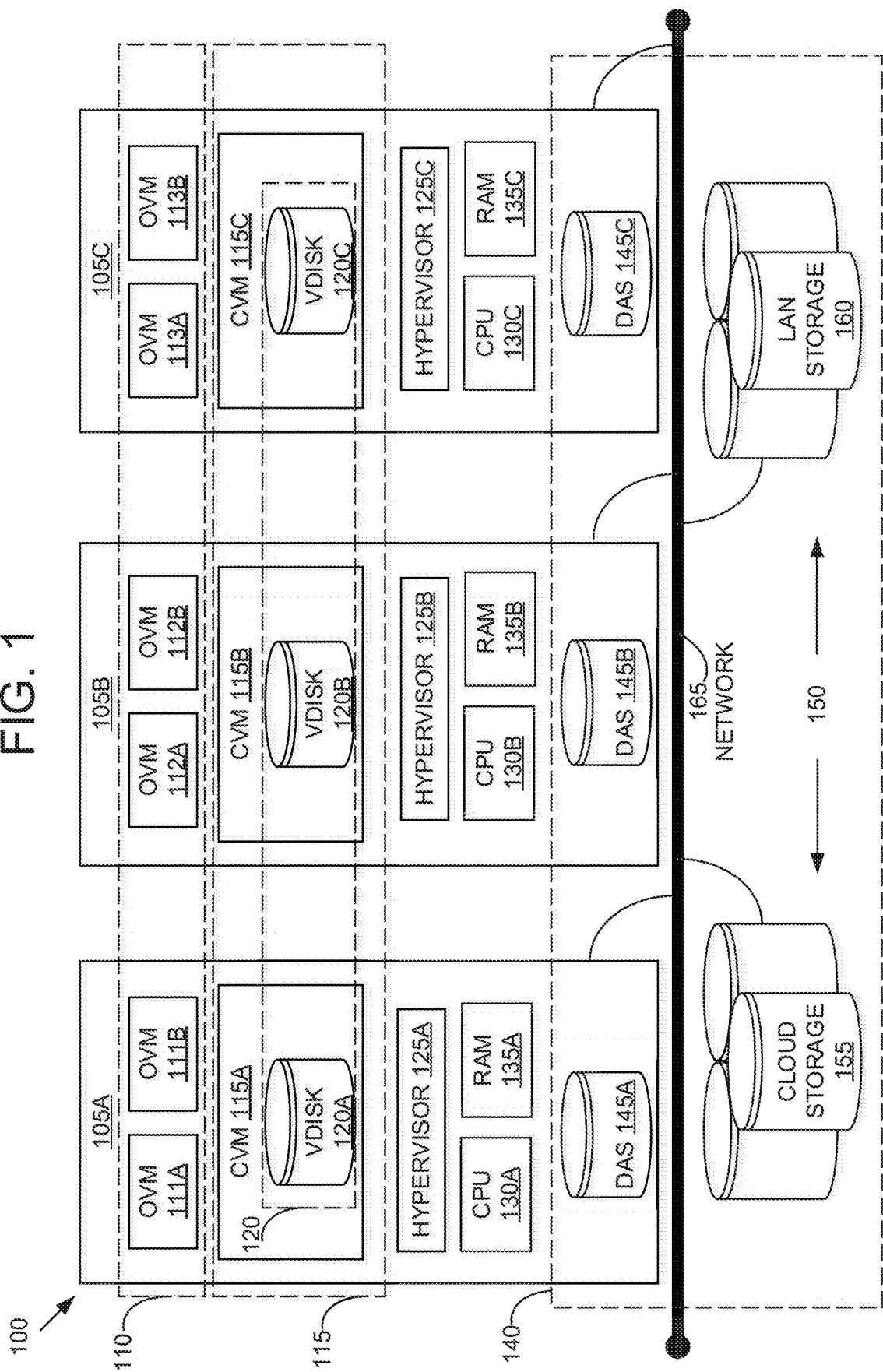
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Data replication improves data availability and accessibility, as well as system resilience and reliability. One common use of data replication is for disaster recovery, to ensure that an accurate backup exists in case of a hardware failure or data breach. However, conventional systems do not provide data protection for object stores across geographic regions. So, for example, if a datacenter goes down, all of the data on the object stores can be lost unless the data was replicated to a datacenter in another region. What is needed is cross-region replication services for object stores.

Synchronous replication ensures all data written in the source storage is simultaneously written in the target storage, and waits for acknowledgement from both storage arrays before completing the operation. Synchronous replication has a large performance overhead of the link between storage arrays and relies on matching storage between source and target with fibre channel latencies to minimize this overhead. Asynchronous replication uses snapshots to take a point in time copy of the data that has changed and sends it to the recovery site on a schedule. The frequency is typically set on a schedule of hours, depending on the number and frequency of snapshots that the storage and application can withstand. Because of the schedule, asynchronous replication has a greater latency than other replication models. Conventional near-synchronous models are problematic because of the storage and latency overhead for tracking changes in the replicated instances. What is needed is a replication service that provides that provides the benefits of synchronous replication and asynchronous replication for object stores, while minimizing the overhead of conventional near-synchronous approaches.

Disclosed herein is a system and method to replicate object storage data and entities across geographic regions in a near-synchronous (sync) approach that uses separate database maps for the object information and the object replication information. Near sync replication for object storage addresses the need for replicating data to maintain multiple copies across failure domains for various reasons including disaster recovery, compliance, availability, etc. The present disclosure provides a method to track changes on the object storage system and replicate the object storage system to other object storage systems including in other geographic regions. Benefits of using separate database maps include reducing storage overhead by only replicating the object information and claiming back storage space by deleting the object replication information after replication is complete. Tracking both database maps can be done using atomic writes to reduce latency. Advantageously, the cross-region functionality ensures greater data protection. Other benefits include a lower latency in replicating than the asynchronous model without the reliance on performance overhead and/or fibre optic cables as in the synchronous model.

Object Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some embodiments, the CVMs 115, and the underlying storage of the nodes (e.g., nodes 105) exposed by the CVMs 115, form one or more storage clusters (e.g., Nutanix Operating System ("NOS") clusters, physical clusters, storage layer). In some embodiments, the NOS cluster is distributed across multiple nodes. For example, the CVMs 115A-C may be a NOS cluster. In some embodiments, the one or more NOS clusters include greater than or fewer than the CVMs 115. In some embodiments, each of the CVMs 115 run a separate, independent instance of an operating system.

In some embodiments, the OVMs 110 form an OVM cluster (e.g., object store cluster, object store system, object storage service, client layer, object layer). OVMs of an OVM cluster may be configured to share resources with each other. The OVMs in the OVM cluster may be configured to access storage from the NOS cluster (e.g., using one or more of the vdisks 120 as a storage unit). In some embodiments, the OVM cluster is distributed across multiple nodes. For example, the OVMs 111A, 112A, and 113A may be an OVM cluster.

Some or all of the OVMs 110 in the OVM cluster may be configured to run software-defined object storage service, such as Nutanix Buckets™ or Nutanix Objects™. As part of the object storage service (OSS), the OVMs 110 may be configured to deploy (e.g., create) a collection of buckets. A bucket is a virtual representation of, and is created on (e.g., on top of), a virtual disk (e.g., the virtual disk 120A in FIG. 1), or other data store. A bucket is like a folder except that a bucket has a hierarchy flat, whereas a folder has recursion (e.g., sub-folders). The OVMs 110 store/add one or more objects in/to one or more of the buckets (by storing the one or more objects in one or more virtual disks 120 backing the one or more buckets), and manage the buckets and objects. An object can be anything: a file, a document, a spreadsheet, a video, a data, metadata, etc. When buckets are created, they are assigned (e.g., given) endpoints through which the OVMs 110, external users or applications interfacing with the OVMs 110, can access them. Examples of endpoints are uniform resource locators (URLs). After a bucket is created, objects can be added.

Regions from vdisks are allocated to buckets. A region provides the high-level mapping between at least one of an object or a bucket and the corresponding locations on a vdisk (e.g., a vDisk ID, vdisk offset, and vdisk length). Vdisks may be subdivided (e.g. chunked) into multiple fixed-size regions. A region can include portions (e.g., chunks, stripes, blocks, locations) of multiple vdisks.

Multiple OVM clusters and/or multiple NOS clusters may exist within a given virtual computing system (e.g., the virtual computing system 100). A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Near-Synchronous Replication of Object Store

In some embodiments, e.g., in a forward path, object operations (e.g., put, update, delete) do (e.g., cause, trigger, etc.) an metadata update to an object replication map (e.g., a key-value pair and/or a column family in a database such as a log structured merge database) to record an entry for replication. In some embodiments, the update is an atomic update along with object info. In some embodiments, the atomicity is guaranteed by keeping a key same for both object info and object replication map entries and updating them together as an atomic write to a metadata storage structure (e.g., a database, a log structured merge database). This map may absorb (e.g., include, store, record, track, combine, etc.) all the pending object replications. In some embodiments, the map has an entry for each object version.

In some embodiments, the object replication map entry tracks a put-id for each object put. In some embodiments, object overwrites and updates replace the put-id, such that the id always corresponds to the latest modification of the object. In some embodiments, the put-id is a global id across all objects assigned from zookeeper. In some embodiments, the map entry is alive (e.g., accessible, readable, not deleted) as long as replication is pending on the object and is purged (e.g., deleted) when the replication of latest version is complete.

Figure 2:
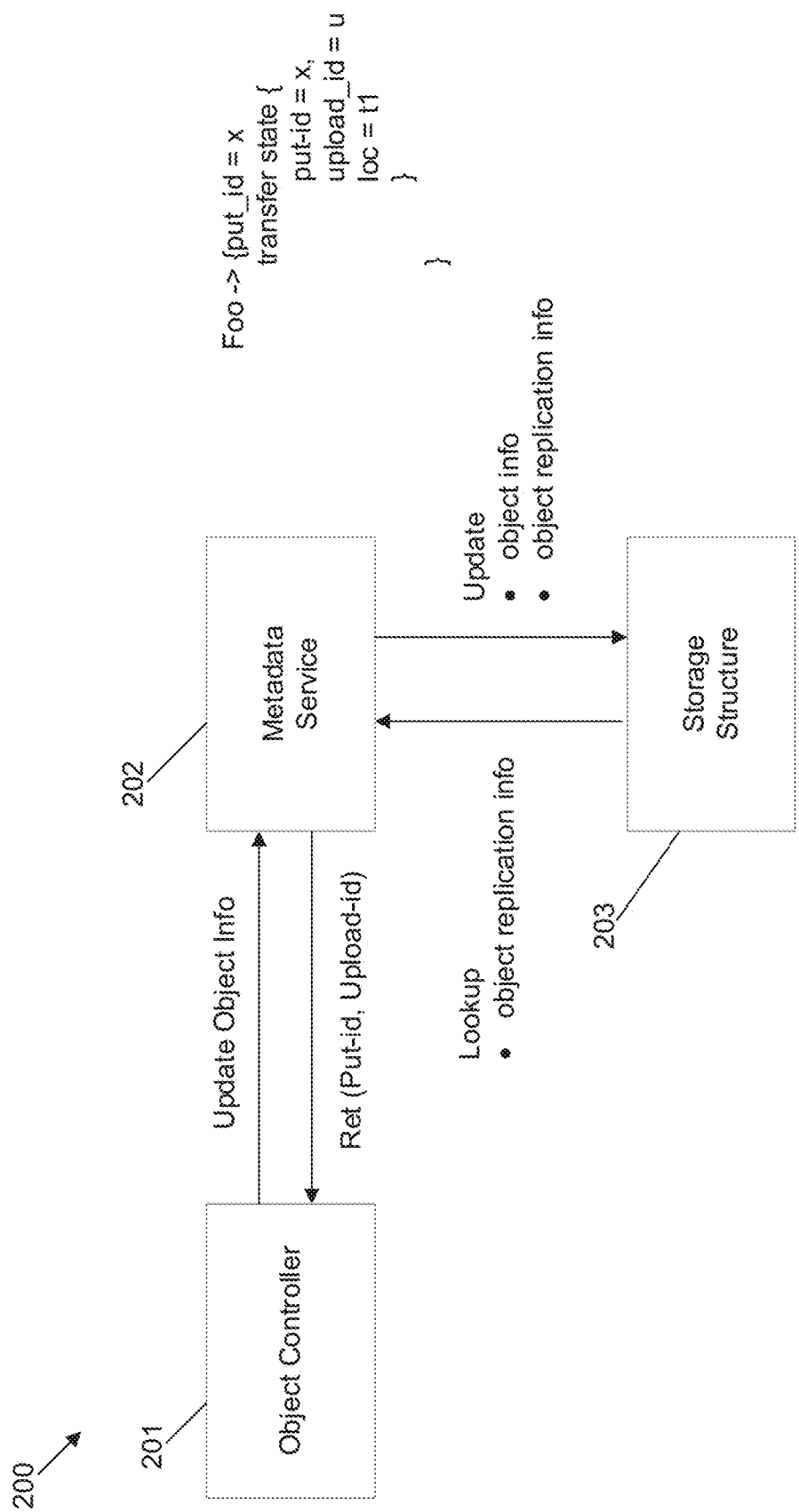
FIG. 2 is an example block diagram of an object store cluster, in accordance with some embodiments of the present disclosure.

Referring now to FIG. 2, an example block diagram of an object store cluster 200 is shown, in accordance with some embodiments of the present disclosure. The object store cluster 200 (e.g., object store instance 200, object store service 200) includes an object controller 201, a metadata service 202 coupled to the object controller 201, and a storage structure 203 coupled to the metadata service 202.

The object store cluster 200 may capture changes in one or more metadata maps. Object and bucket mutations create an entry in the one or more metadata maps. Overwrites may be absorbed in place.

In some embodiments, the storage structure 203 stores the map for storing object mutations (e.g., changes, delta) that may be replicated from a first object store service to a second object store cluster. In some embodiments, the metadata service 202 creates (e.g., generates, identifies) a map entry for each object that may be replicated. In some embodiments, the object controller 201 updates (e.g., sends a request to the metadata service 202) object information (info) for an object that is replicated to another cluster. In some embodiments, the metadata service 202 or the object controller 201 tracks an identifier (put -id) for each object mutation. The put-id may correspond to the latest mutation of the object.

In some embodiments, the metadata service 202 updates/replaces metadata associated with the object info and object replication info, including the put-id. In some embodiments, the object overwrites, and the put-id is updated/replaced (read modify write). The put-id may be global id across all objects (e.g., of a bucket, a cluster, multiple clusters). The object replication info may be updated along with object info. In some embodiments, a same key is used for both object info and object replication map entries. In some embodiments, the metadata write (e.g., atomic write) to the storage structure 203. In some embodiments, each of the object info and object replication info are stored as a key-value. For example, the key is the object info map key and the value is at least one of the put id, an upload id, a time to delete, a time when created, or a transfer state of at least one of the put id or the upload id.

Figure 3:
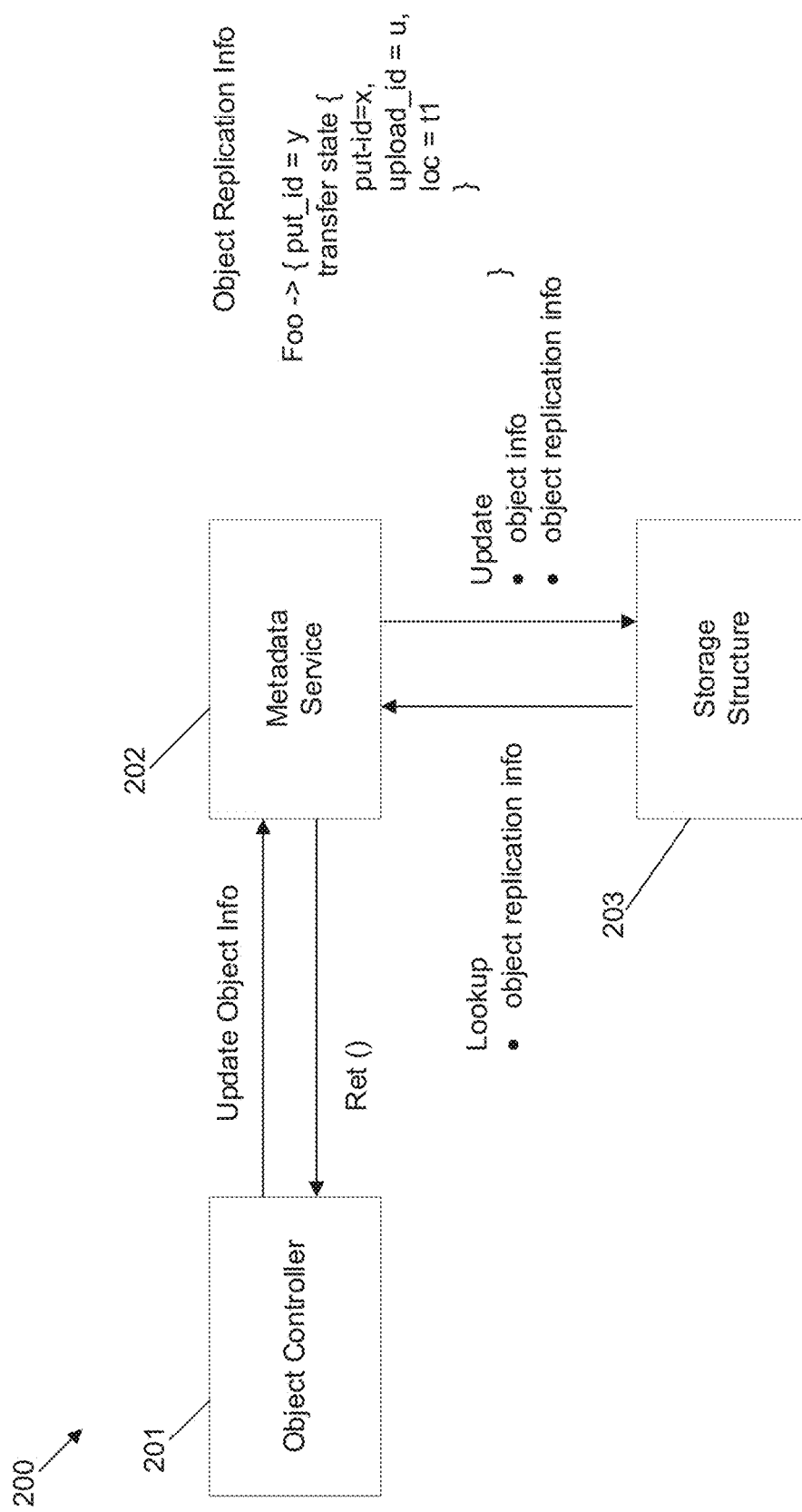
FIG. 3 is an example block diagram of an object store cluster, in accordance with some embodiments of the present disclosure.

In some embodiments, the object store cluster 200 may perform concurrent puts. Referring now to FIG. 3, an example block diagram of the object store cluster 200 is shown, in accordance with some embodiments of the present disclosure. A concurrent put is a put operation by multiple object controllers like object controller 201. When performing concurrent puts, the put id for the entry may be different than the put id for each object instance associated with each object controller.

Bucket operations would follow the same approach as object operations workflow, just that the entries are maintained in a separate map bucket replication map.

In some embodiments, the storage structure 203 stores a map for storing bucket mutations (e.g., changes) that may be replicated from a first object store cluster to a second object store cluster. In some embodiments, the metadata service 202 creates (e.g., generates, identifies, stores in memory) a map entry for each bucket that may be replicated. In some embodiments, the bucket controller 201 updates (e.g., sends a request to the metadata service 202) bucket information (info) for an bucket that is replicated to another cluster. In some embodiments, the metadata service 202 or the bucket controller 201 tracks an identifier (put -id) for each bucket mutation. The put-id may correspond to the latest mutation of the bucket.

In some embodiments, the metadata service 202 updates/replaces metadata associated with the bucket info and bucket replication info, including the put-id. In some embodiments, the bucket overwrites, and the put-id is updated/replaced (read modify write). The put-id may be global id across all buckets (e.g., of a bucket, a cluster, multiple clusters). The bucket replication info may be updated along with bucket info. In some embodiments, a same key is used for both bucket info and bucket replication map entries. In some embodiments, the metadata write (e.g., atomic write) to the storage structure 203. In some embodiments, each of the bucket info and bucket replication info are stored as a key-value.

The storage structure 203 may include a log-structured merge-trees (LSM tree) tree based key-value (KV) store. The LSM tree based KV store includes a Commitlog, a MemTable, and SSTables. The Commitlog and sorted string tables (SSTables) are on-disk while the MemTable is an in-memory data structure. The Commitlog is an append-only file which is used as a log for recovery purposes. The MemTable is used to absorb writes and speed up the write path. The SSTables are sorted, immutable files which store all the key-value pairs persistently. The SSTables are sometimes divided into multiple levels, with each level having larger SSTables than the one before it.

An LSM tree's write/update to a key is treated as a new write and does not update the previous value for the key. This gives the advantage of writes being fast as it does not search for the previously written value and then update it.

The write path involves appending the Commitlog file with the key-value pair (e.g., database map, metadata entry of database map) and then updating the MemTable. All writes have to be sequentially written to the Commitlog and if writes come in parallel, they will be serialized while writing to it. Once the MemTable or the Commitlog crosses a predefined limit, the MemTable content is written into the disk (flushing) to create an SSTable. The SSTable contains the key-value pairs sorted based on the key. However, since updates to keys are treated as new writes, the multiple SSTables may include duplicate entries for the key, where the newest SSTable always has the right value for the key. To clean up the older entries, LSM trees perform compaction.

An LSM's read is more involved process, in some embodiments. It can require searching for the value of the key in the MemTable and multiple SSTable files. This is the consequence of updates being treated as new writes and leaving existing values to be cleaned up by compaction. Hence, the LSM does all the querying in parallel to avoid wasting time on the MemTable or a single SSTable.

Some embodiments for the read path include consulting the most recent SSTables first since the newest entry is always the right one and using bloom filters to filter out SSTables. Bloom filters provide the guarantee that if the bloom filter returns false, then the key definitely does not exist in the SSTable, but if the bloom filter returns true, then the key might still not exist in the SSTable.

The efficiency of the read path heavily depends on the number of SSTable files in the LSM since at least one disk I/O (e.g., read or write) may be performed per SSTable file. The size amplification of the LSM tree directly impacts the read performance of the LSM tree.

Scan operations on the LSM involves finding all valid key-value pairs in the database, usually between a user-defined range. A valid key-value pair is one which has not been deleted. While each SSTable file and the MemTables are sorted structures, they can have overlapping ranges causing, in some embodiments, an un-sorted view of the entire database.

The LSM iterator may generate a sorted view for the client. In some embodiments, it iterates through the keys for every SSTable and is also responsible for discarding the obsolete key-value pairs returned from older SSTables which have not been compacted yet.

Scans are generally more challenging to solve in an LSM based key-value store than a B-tree based store due to the presence of obsolete key-value pairs in older SSTables that need to be skipped. Scan performance is also directly tied to the number of SSTable files and the amount of obsolete key-value pairs present in the database. Reading obsolete key-value pairs has an impact to performance by using additional CPU, memory, and I/O bandwidth.

Compaction is the key process that is responsible for cleaning up obsolete key-value pairs and reducing the number of SSTables in the database. Compaction includes, in some embodiments, selecting the SSTable files to perform compaction for (e.g., there are various heuristics that different implementations consider), reading all the key-value pairs from the SSTables into memory, merging the key-value pairs to form a single sorted stream (including removing the obsolete key-value pairs due to updates or deletes), writing the single sorted stream as a new SSTable file, and deleting the old/obsolete SSTable files.

In some embodiments, compaction is a CPU/memory intensive process since it maintains a large number of keys and has to perform merge-sort across multiple incoming sorted streams. In some embodiments, compaction is I/O intensive since it can generate read and write working sets which encompass the entire database and in-turn impact user-facing read/write/scan operations.

Figure 4:
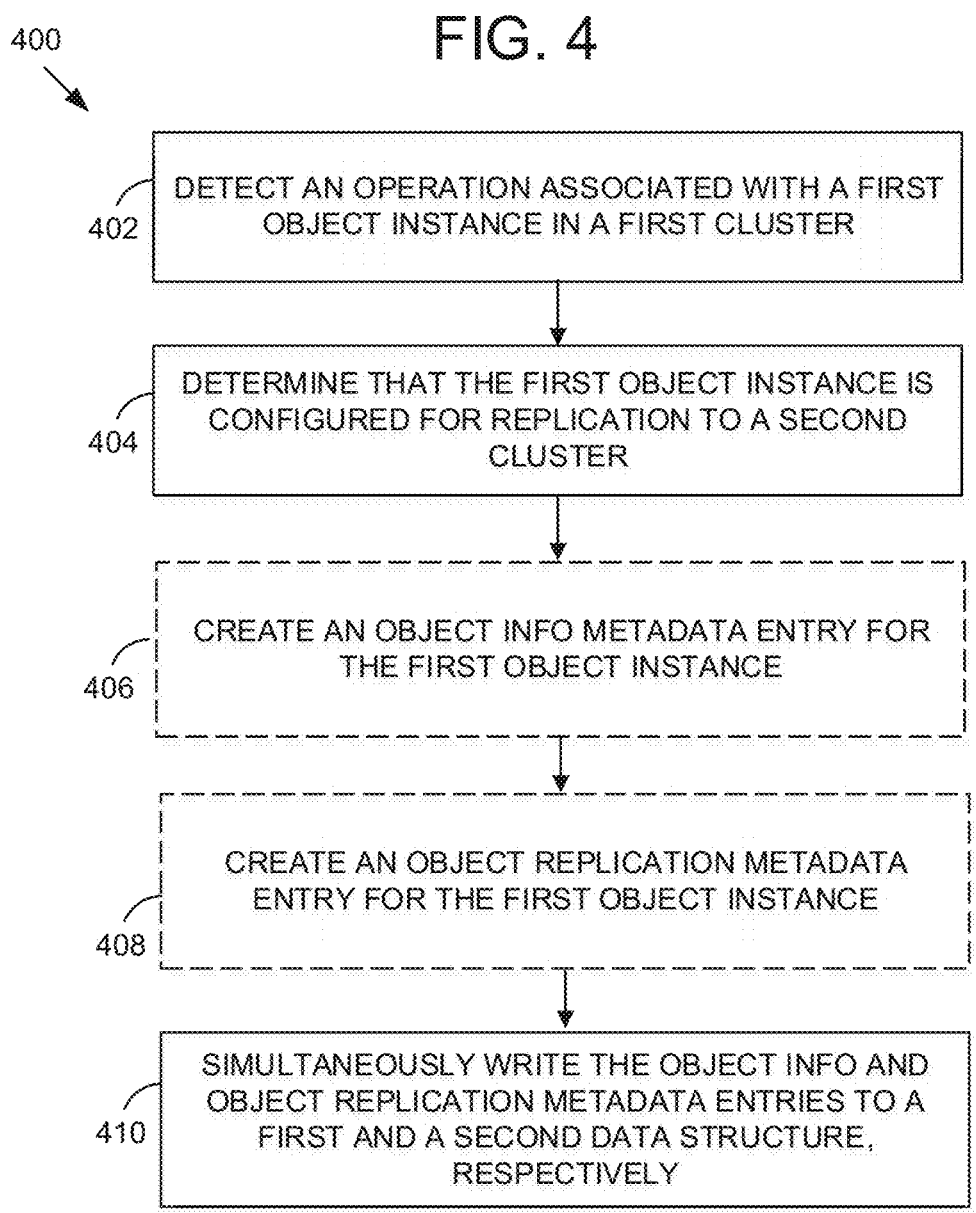
FIG. 4 is a flowchart of an example method for tracking changes, in accordance with some embodiments of the present disclosure.

Referring now to FIG. 4, a flowchart of an example method 400 for tracking change is illustrated. The method 400 may be implemented using, or performed by, an object store cluster 200, one or more components/elements/entities of the object store cluster 200, a processor associated with the object store cluster 200, or one or more processors respectively associated one or more components/elements/entities of the object store cluster 200, which is detailed herein with respect to the virtual computing system 100 of FIG. 1 and the object store cluster 200 of FIG. 2. Additional, fewer, or different operations may be performed in the method 400 depending on the embodiment.

A first cluster (e.g., the object store cluster 200) detects an operation (e.g., a request, an operation request, an API call, a put operation, a get operation, etc.) associated with the first object instance in the first cluster (402). In some embodiments, the first cluster is in a first geographic region (e.g., first availability zone). The operation may be from a client (e.g., a user, an API user, another application). The first cluster determines that the first object instance is configured for replication to a second cluster (404). In some embodiments, the second cluster is in a second geographic region (e.g., second availability zone) different from the first geographic region. In some embodiments, the first cluster determines that the first object instance is configured for replication by identifying (e.g., extracting, reading, determining) the object replication configuration from a policy (e.g., object policy, user policy, geographic region policy, etc.)

If not already created, the first cluster creates an object information (info) metadata entry for a first object instance in the first cluster replicated to a second object instance in a second cluster (406). If not already created, and, in some embodiments, responsive to determining that the first object instance is configured for replication, the first cluster creates an object replication metadata entry for the first object instance (408). In some embodiments, the metadata entries are created in-memory (e.g., in volatile memory, in a cache associated with a processor, in a MemTable associated with an LSM database). In some embodiments, a first portion of at least one of data or metadata associated with the operation is written to the object info metadata entry, and a second portion of the at least one of data or metadata associated with the operation is written to the object replication metadata entry (e.g., in-memory).

The object store cluster (e.g., simultaneously, at a same time) writes (e.g., updates, atomic writes) the object info metadata entry and the object replication metadata entry to a first data structure and a second data structure, respectively (410). In some embodiments, the first and second data structures are separate database maps (e.g., key-value pairs, columns, column families in an LSM database). In some embodiments, (e.g., only) the object info metadata entry is replicated to a secondary cluster. In some embodiments, a duration (e.g., lifetime, time to expiry, etc.) of the object info metadata entry is greater than a predetermined or dynamic threshold (e.g., more permanent) and a duration of object replication metadata entry is less than the predetermined or dynamic threshold (e.g., more temporary). In some embodiments, after replication is completed (see FIG. 7 below), the object replication metadata entry is deleted. Advantageously, having the separate database maps reduces overhead (e.g., memory overhead) by at least one of deleting, reducing the duration of, or not replicating the object replication metadata entry.

In some embodiments, the first cluster sends, to the client, a response to the operation associated with the first object instance in the first cluster. In some embodiments, the response to the operation is responsive to (e.g., simultaneously) writing the object info metadata entry and the object replication metadata entry to a first data structure and a second data structure, respectively.

Data transfer may keep a single outstanding replication operation per object from source. This may prevent races from parallel transfers and thereby no need to provide protection on remote against stale updates. The object store cluster 200 may utilize multipart capability for large data transfer to the remote site. This naturally provides the ability to chunkify large objects in to parts and also to restart the transfer up on failures.

In some embodiments, an object controller (OC) such as the object controller 201 starts replication, e.g., in the forward path, if there is no previous entry for the object in a transfer map. In some embodiments, concurrent replications from other OCs back off if a previous version is found. In some embodiments, when the replication is complete for a version, and, if it is the latest version, the transfer map entry is deleted.

Replications are backed off during the forward path and failed transfers may be restarted by background scans. In some embodiments, replications started through background scan read the object metadata from a remote cluster to determine if the metadata and an etag (entity tag) matches from the source cluster before transferring the data and/or metadata. In some embodiments, the etag stored in object info is an md5sum of data. In some embodiments, the metadata of object is copied over during finalization of the transfer. In case of multipart transfer, a multipart finalization may set the metadata, and, in case of normal put, the put itself may set the metadata.

Figure 5:
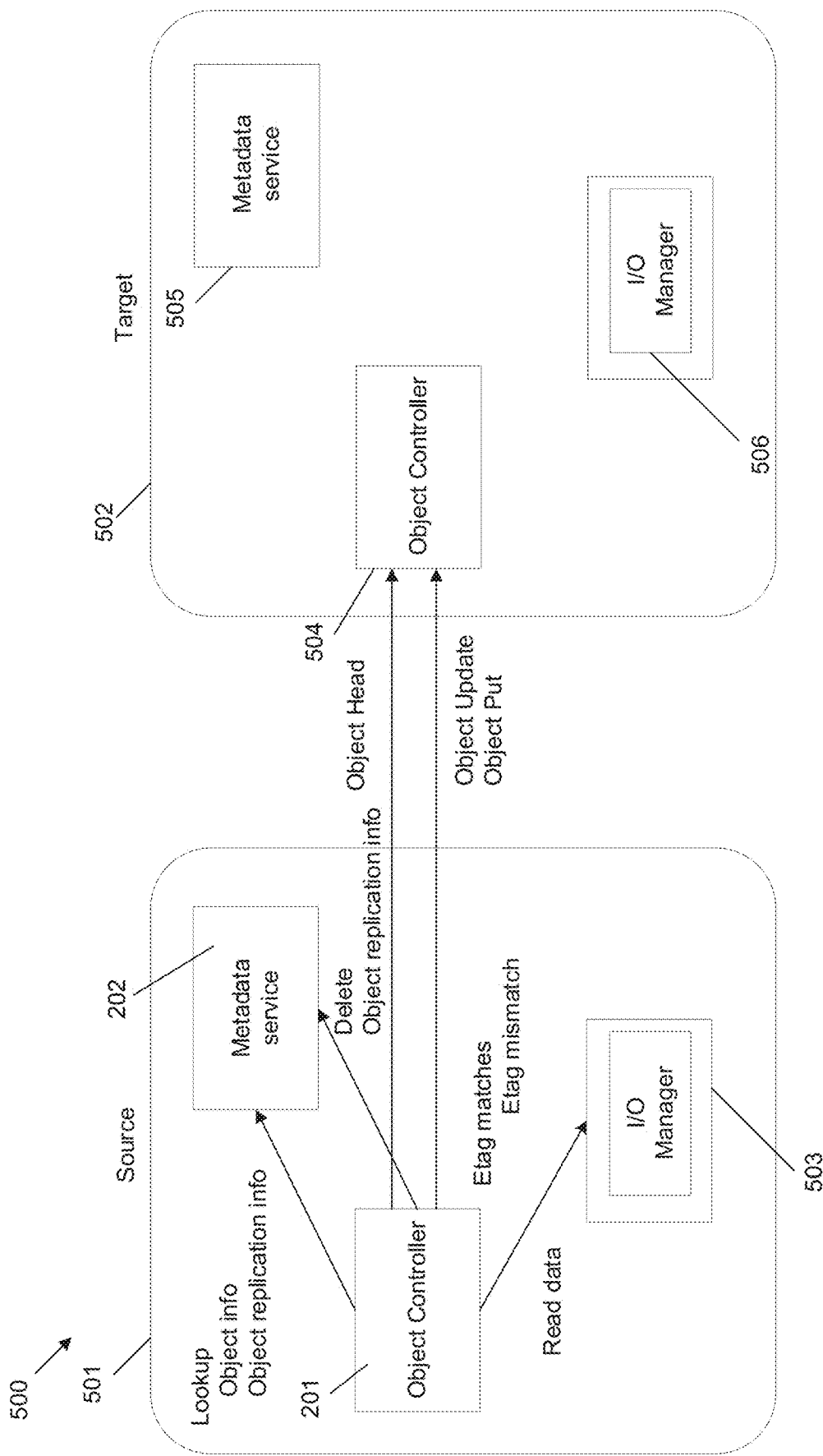
FIG. 5 is an example block diagram of multiple object store clusters instances, in accordance with some embodiments of the present disclosure.

Referring now to FIG. 5, an example block diagram of multiple object store clusters 500 is shown, in accordance with some embodiments of the present disclosure. The object store clusters 500 include a source object store cluster 501 and a target object store cluster 502 in communication with the source object store cluster 501. In some embodiments, the source object store cluster 501 is in a first geographic region, and the target object store cluster 502 is in a second geographic region different from the first geographic region. Each of the object store clusters includes an object controller, a metadata service, and an I/O manager. For example, the object store cluster 501 includes an object controller 201, a metadata service 202, and an I/O manager 503, and the target object store cluster 502 includes an object controller 504, a metadata service 505, and an I/O manager 506.

In some embodiments, the object controller 201 looks up object info and object replication by using (e.g., causing, communicating with, instructing, sending a request) the metadata service 202. In some embodiments, the object controller 201 reads data by using the I/O manager 503. In some embodiments, the object controller writes at least one of an object head, an object update, or an object put by using the object controller 504 in the target object store cluster 502. In some embodiments, after the object put/update is performed, the object controller 201 determines whether an entity tag of a first object instance in the source object store cluster 501 matches an entity tag of a replicated object instance in the target object store cluster 502. If the entity tags match, the object controller 201 deletes the object replication info by using the metadata service 202.

Objects larger than a predetermined threshold may use a multipart upload whereas objects smaller than the predetermined threshold may do normal (e.g. non-multipart) put. For large transfers using multipart upload, an upload id is generated by the metadata service 202 and can be stored within the transfer map entry. In case of multipart transfer, a multipart finalization may set the metadata.

In some embodiments, for multipart objects the etag stored in object info is a combination of md5sum of individual parts. When the large object is copied over, the etag from source object may be copied to remote object instead of relying on a secondary object controller or metadata service to recompute the etag. For data integrity validation, during the transfer the large object can be chunked into different sized parts (e.g., regardless of original part sizes) and the checksum for those parts can be computed on both sites to verify the data integrity.

Figure 6:
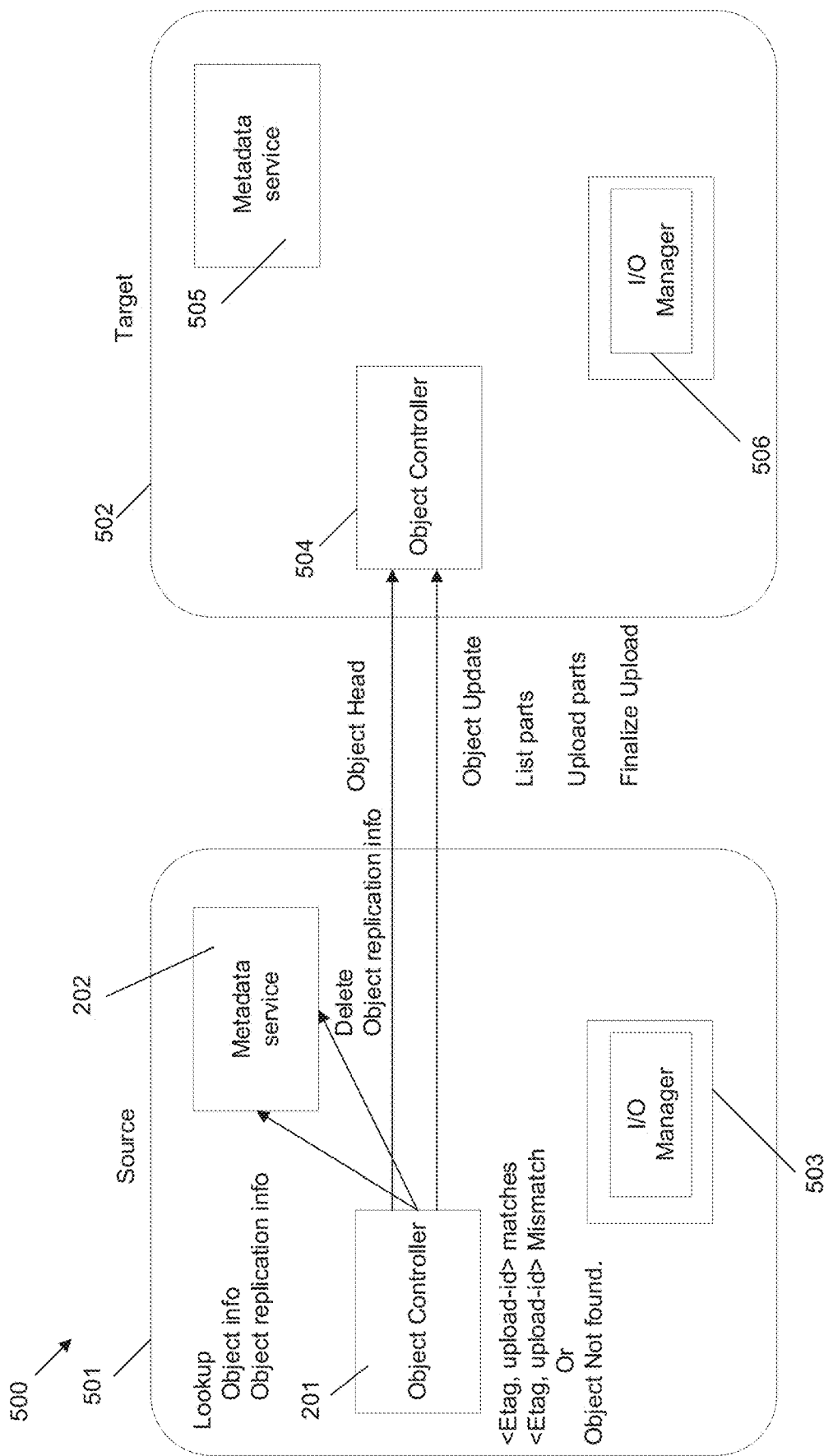
FIG. 6 is an example block diagram of multiple object store clusters, in accordance with some embodiments of the present disclosure.

Referring now to FIG. 6, an example block diagram of the multiple object store clusters 500 is shown, in accordance with some embodiments of the present disclosure. The object controller 201 may perform the operations performed with respect to FIG. 5. Additionally or alternatively, the object controller may at least one of list parts, upload parts, or finalize upload, using the object controller 504.

Referring now more generally to a data transfer (e.g., with respect to FIGS. 5-6), some approaches keeps both put id and transfer state in a same object replication map entry. As a result, the object controller 201 does a lookup and update to the object replication map in the forward path during object put to determine if there is a pending replicate operation. The lookup to the object replication map to check the presence of key may be an in-memory lookup as bloom filters may be cached by the storage structure 203. In the object replication map entry, the key may be same as object info map, and the value may include at least one of a put id or a replication state of at least one of a put id, an upload id, or a LOC.

Table 1 shows an example of replication operations in the forward path:

TABLE 1

| Object Controller | Metadata Service | Remote Site |
|---|---|---|
| Object put data write | | |
| | 1. Lookup and Update object replication map with put-id x. If lookup succeeds, return replicate = false, otherwise return replicate = true<br>2. Assign multipart upload id for large object and store in object replication map entry and return upload id. | |
| Object put done Start replication with x Issue Object Put or Start multipart upload | | |
| | | Object put or upload parts |
| Send Finalize transfer (if multipart) | | |
| | | Finalize transfer (if multipart) |
| | Object replication map entry Lookup and Delete if put-id = x | |

Table 2 shows an example of replication operations in the background:

TABLE 2

| Object controller | Metadata service | Remote site |
|---|---|---|
| Receives replication from background scan service for object | | |
| | Lookup object metadata (object info and user metadata) Lookup object replication map for latest put-id and multipart-upload-id | |
| Send object head | | |
| | | Object head |

TABLE 2-continued

| Object controller | Metadata service | Remote site |
|---|---|---|
| Compare metadata If etag matches, check and sync metadata. If etag does not match, transfer full object. For multipart uploads, compare both upload_id and etag as pair. | | |
| | | Set Object Attributes or Object Put/Continue multipart upload |

Some approaches have the object replication map track the latest put id of object and a data transfer map to track the transfer of put id. During object put, some approaches update the object replication map entry with latest put id. Serialization between replicate operations may be achieved by lookup and update of data transfer map entry which is in the background path.

Table 3 shows an example of replication and change tracking operations:

TABLE 3

| Object Controller | Metadata Service | Remote Site |
|---|---|---|
| Object put data write | | |
| | Update object info and object replication map with put-id x, return x. | |
| Object put done Start replication for put-id = x | | |
| | 1. Lookup data transfer map entry for object. If lookup is success, (meaning outstanding op), then abort. Otherwise update data transfer map with put-id x.<br>2. Allocate multipart upload-id if needed. | |
| Issue Object Put or Start multipart upload | | |
| | | Object put or upload parts |
| Send Finalize transfer (if multipart) | | |
| | | Finalize transfer (if multipart) |
| | Data transfer map entry delete. Object replication map entry Lookup and Delete if put-id = x | |

Figure 7:
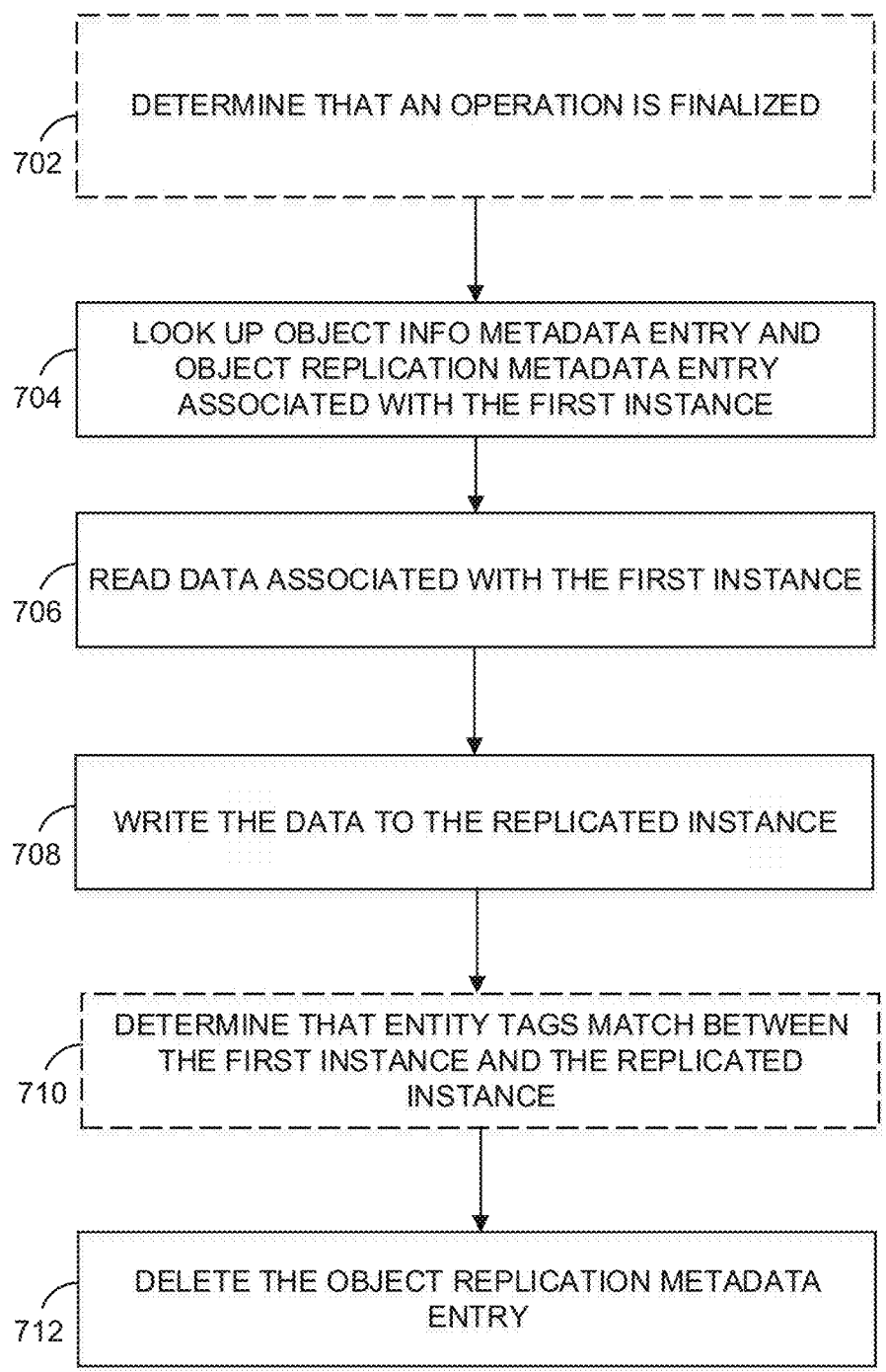
FIG. 7 is a flowchart of an example method for transferring data, in accordance with some embodiments of the present disclosure.

Referring now to FIG. 7, a flowchart of an example method 700 for transferring data is illustrated. The method 700 may be implemented using, or performed by, the object store cluster 200, the source object store cluster 501, one or more components/elements/entities of the object the object store cluster 200 or the source object store cluster 501, a processor associated with the object store cluster 200 or the source object store cluster 501, or one or more processors respectively associated one or more components/elements/entities of the object store cluster 200 or the source object store cluster 501, which is detailed herein with respect to the virtual computing system 100 of FIG. 1, the object store cluster 200 of FIG. 2, and the multiple object store clusters 500 of FIG. 5. Additional, fewer, or different operations may be performed in the method 700 depending on the embodiment. In some embodiments, the method 700 is part of a bigger method including the method 400. In some embodiments, one or more operations from the method 700 are combined with (e.g., incorporate) one or more operations from the method 400.

In some embodiments, a first cluster (e.g., the source object store cluster 501, the object store cluster 200) determines that an operation requested by a client is finalized (702). In some embodiments, the first cluster is in a first geographic region. In some embodiments, the first cluster responds, to the client requesting the operation, that the operation was successful. In some embodiments, a first component of the first cluster determines that a second component of the first cluster responds, to the client requesting the operation, that the operation was successful.

The first cluster looks up object information (info) metadata entry and the object replication metadata entry associated with a first instance in the first cluster that is replicated to a replicated instance in a second cluster (e.g., the target object store cluster 502) (704). In some embodiments, the second cluster is in a second geographic region different from the first geographic region. The first cluster reads data associated with the first instance (706). The first cluster writes the data to the replicated instance (708). In some embodiments, the first cluster writes the object info to the replicated instance.

In some embodiments, the first cluster determines that an entity tag of the first instance and an entity tag of the replicated instance match (710). The first cluster deletes the object replication metadata entry (712). In some embodiments, the first cluster deletes the object replication metadata entry responsive to determining that the entity tags match.

In some embodiments, a component id space has to be synced. Object version numbers may be kept same on both sites. The component id may be incremented (e.g., bumped up) whenever the metadata service 202 on the source object store cluster 501 allocates batch of ids. Multipart objects may be replicated up on finalization of upload on the source object store cluster 501. Part objects are not replicated as they are uploaded. In some embodiments, incoming user input/output (IO) is disallowed if the cluster is in passive state, and incoming replication IO is disallowed if cluster is in active state (herein, "IO fencing").

Customers may like to know the approximate time up to which all objects are replicated (herein, "last sync time"). The object replication map may be scanned. The lowest timestamp entry still waiting to be replicated may be identified. The create time during update of object replication map entry may be preserved. A sliding window of buckets may track a number of active replications (herein, "in memory index"). Buckets corresponds to a hourly window and number of objects waiting to be replicated.

Figure 8:
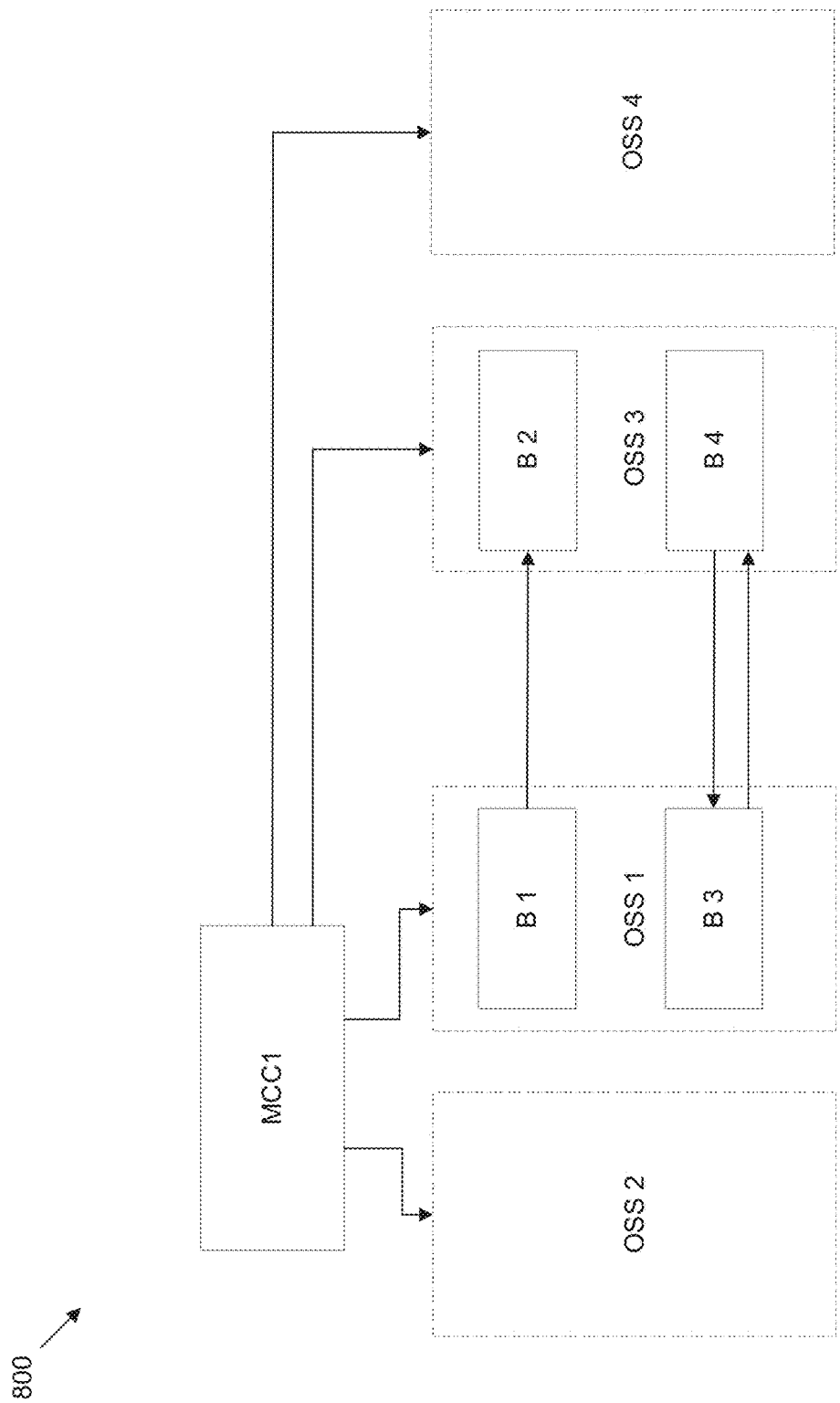
FIG. 8 is an example block diagram of multiple object store clusters, in accordance with some embodiments of the present disclosure.

Referring now to FIG. 8, an example block diagram of multiple OVMs 800 is shown, in accordance with some embodiments of the present disclosure. The multiple OVMs 800 include object store services OSS1-4. Each OSS is a cluster of OVMs similar to the object store clusters of FIGS. 1-3 and 5-6. The multiple OVMs 800 include a multi-cluster coordinator MCC1 in communication with the OSS1-4. Some of the OSSs include one or more buckets. For example, as shown in FIG. 8, OSS1 includes buckets B1 and B3, and OSS3 includes B2 and B4. B2 is in communication with B1 and B4 is in communication with B3.

Replication can be enabled between any buckets. Replication can be unidirectional. For example, an application (e.g., the object controller 201) replicates B1 to B2 but an application does no replicate B2 to B1. Replication can be bidirectional. For example, the replication between B3 and B4 is bidirectional. The recursion may be prevented based on the source of the IO. There may be no fencing of object IO at either region/buckets.

In some embodiments, with replication enabled, the application writes to (e.g., only) one bucket (e.g., B3 or B4 with bidirectional replication set or B1 in case of unidirectional replication) and the data gets replicated to the replica bucket. In some embodiments, the application writes to both buckets. If the application writes to both the buckets, the last write (that our OC or background does) wins regardless of their ingest time.

The buckets can be either in versioning or non-versioning state but the bucket's versioning may be the same. For example, both (B3 and B4) can be version enabled or disabled (suspended). In some embodiments, replication fails until the versioning states match.

When a site/region/instance is/becomes unavailable (e.g., failover), the application/user can write to the other site and writes may get replicated back (or not) depending on the relationship set.

Referring to FIG. 8, if a region with B1 fails, application writes to B2 (instead of B1), there is no replication to B1, so, after B1 comes back online, B1 does not have the delta. If B3 fails, the application writes to B4, and B3 comes back online, then data written to B4 gets replicated to B3. If both B3 and B4 have the updates for the same object, any version (in case of versioning enabled and collision of version id) or any of the new data (in case of versioning disabled) becomes the current. However, the integrity of such data may remain the same. For example, if object O1 with md5 M1 is on B1 replication map and O1 with md5 M2 is on B2 replication map, then either one of these can be the (e.g., actual) data, and the data has M1 or M2 (e.g., but not something else).

In some embodiments, WORM (write once, read many) policy is not enforced on replica buckets. For example, if one (B3) has WORM enabled the other (B4) may or may not have WORM enabled and it may be up to the user to maintain the policies on the buckets accordingly. Besides versioning, there is may be no other enforcement. The retention can be different, as any other metadata.

In some embodiments, there is no baseline replication. The replication may commence from the time it is enabled. In some embodiments, the user can break the replication relationship at any time and recreate relationship anytime. There is no restriction and each relationship can be similar to a new relationship.

In some embodiments, chain replication may be performed. For example B1 is replicated to B2, which is replicated to B5. In some embodiments, a single bucket can serve as the source of multiple buckets that is, B1 can be replicated to B2 and B6. A single bucket can serve as the destination of multiple buckets, that is B1 and B2 may replicate to B6.

A planned failover may include manually demoting the primary/source cluster to passive state and promote the secondary to active state. In some embodiments, in an unplanned failover (e.g., a disaster event), the primary cluster goes down and the secondary cluster is manually promoted to active state to allow user IO. In some embodiments, object and bucket replication maps grow in size as long as the replication relationship is not broken. During extended outages, if the replication relation is broken, the replication maps on secondary can be discarded.

During a failback, in some embodiments, a primary cluster transitions to become active. In some embodiments, the object replication map is discarded on the source cluster. Un-synced deletes may remain as permanent garbage. Un-synced object puts may be lost. Pending deletes may be reconciled with remote replication map to avoid garbage. In some embodiments, pending entries in object replication map are replicated from secondary to primary cluster. Primary IO on secondary cluster may be throttled. When the diff is very small, new user IO may be temporarily stopped and the re sync may be completed. In some embodiments, the secondary cluster is switched to passive state and primary cluster is switched to active.

Figure 9:
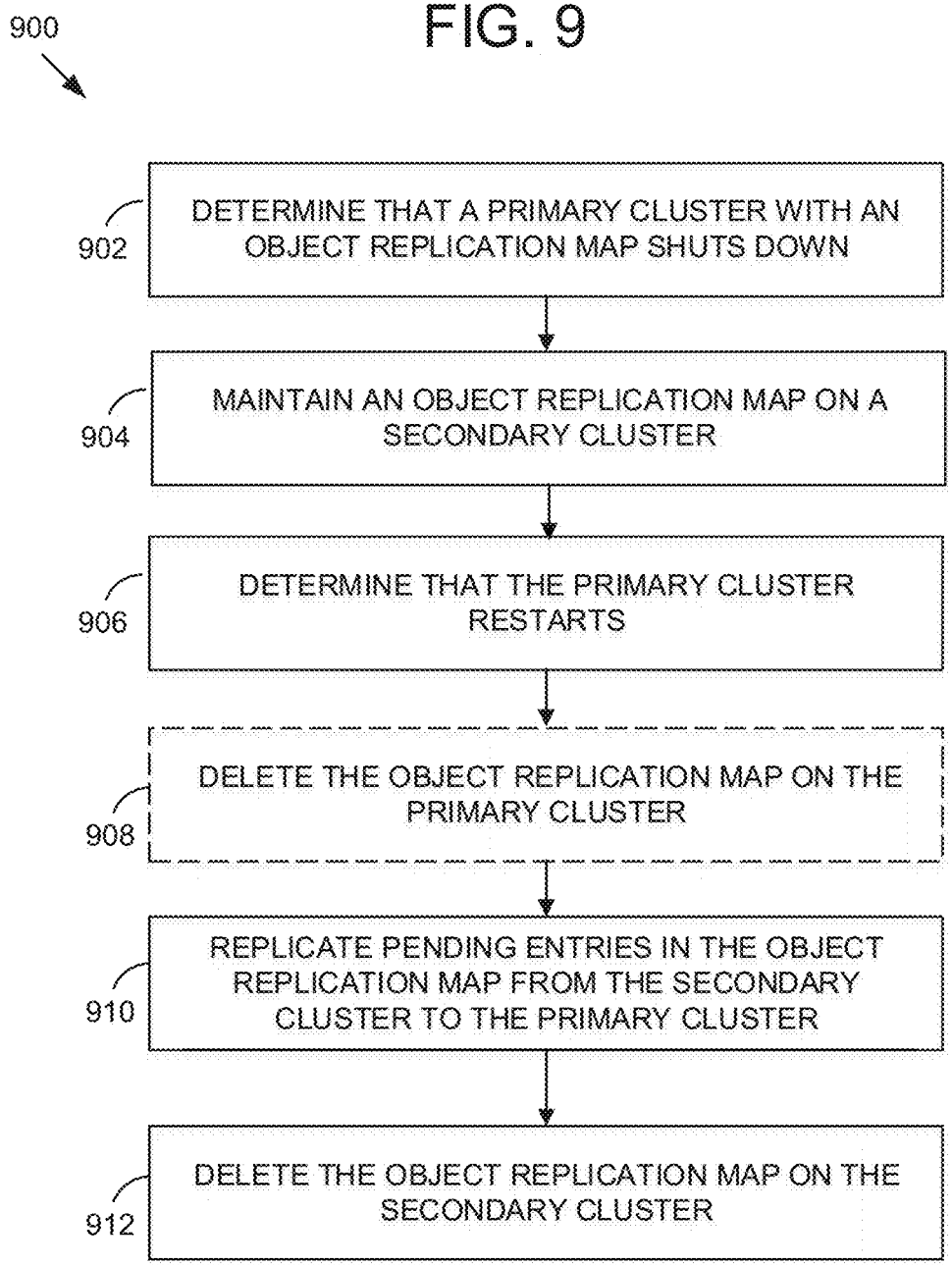
FIG. 9 is a flowchart of an example method for failover and failback, in accordance with some embodiments of the present disclosure.

Referring now to FIG. 9, a flowchart of an example method 900 for failover and failback is illustrated. The method 900 may be implemented using, or performed by, the object store cluster 200, the source object store cluster 501, the multi-cluster coordinator MCC1, one or more components/elements/entities of the object the object store cluster 200 of the source object store cluster 501, a processor associated with the object store cluster 200, the source object store cluster 501, or the multi-cluster coordinator MCC1, or one or more processors respectively associated one or more components/elements/entities of the object store cluster 200, the source object store cluster 501, or the multi-cluster coordinator MCC1, which is detailed herein with respect to the virtual computing system 100 of FIG. 1, the object store cluster 200 of FIG. 2, the multiple object store clusters 500 of FIG. 5, or the multiple object store clusters 800 of FIG. 8. Additional, fewer, or different operations may be performed in the method 900 depending on the embodiment. In some embodiments, the method 900 is part of a bigger method including at least one of the methods 400 and 700. In some embodiments, one or more operations from the method 900 are combined with one or more operations from at least one of the methods 400 and 700.

A multi-cluster coordinator MCC (e.g., MCC1) determines that a primary cluster (e.g., OSS1) with a first object replication map shuts down (902). In some embodiments, the primary cluster is in a first geographic region. In some embodiments, the MCC determines that multiple, or all, primary clusters in the first geographic region shut down. The multi-cluster coordinator MCC (e.g., MCC1) maintains (e.g., sets as active, gives priority to, creates, generates, loads, etc.) a second object replication map on a secondary cluster (e.g., OSS2) (904). In some embodiments, the secondary cluster is in a second geographic region different from the first geographic region. In some embodiments, maintaining the second object replication map is in response to the primary cluster shutting down.

The MCC) determines that the primary cluster restarts (906). In some embodiments, the MCC deletes, or causes the primary cluster to delete, the first object replication map on the primary cluster in response to the primary cluster restarting (908). In some embodiments, deleting the first object replication map is in response to a primary cluster restarting. In some embodiments, the MCC saves (e.g., keeps, stores, maintains, does not delete), or causes the primary cluster to save, the first object replication map. In some embodiments, the MCC uses, or causes one of the clusters to use, the first object replication map for conflict resolution.

The MCC replicates, or causes the secondary cluster to replicate, pending entries in the second object replication map from the secondary cluster to the primary cluster (910). In some embodiments, the MCC, compares, or causes one of the clusters to compare, the etags of the two clusters. The MCC deletes, or causes the secondary cluster to delete, the second object replication map on the secondary cluster (912).

In some embodiments, connections are managed directly between object store services like object controllers or metadata services. Some approaches use an envoy or other forward proxy for communication between two objects instances. The envoy may be coupled to the OSS. In some embodiments, the envoy allows to form a service mesh where services are exposed through envoy proxy. In some embodiments, the communication between objects services happen through envoy, which, in some embodiments, does transmission control protocol (TCP) forwarding.

A given customer may choose to deploy several objects instances for under a single multi-cluster domain or multiple multi-cluster domains. In some embodiments, an object store cluster deploys an identity access management (IAM) instance and all object store instances under a multi-cluster coordinator (e.g., MCC1) connect to the same master IAM. To support object store replication in a multi-MCC domain, a global IAM may be used, in which object store instances from any MCC can connect to a single master IAM service.

A global IAM can be achieved by proxy routing at the envoy where a remote IAM instance can be made available to any object store instance irrespective of which MCC it belongs. In some embodiments, the master IAM1 instance is exposed through Envoy1. In some embodiments, Envoy2 maintains a forwarding rule for IAM service as local-endpoint remote endpoint pair.

In some embodiments, the IAM database is needed on the target cluster when it becomes active. Replication of (access) keys can be done at the IAM application layer. Replication can be at the database layer (e.g., using IDF sync or postgres replication). Replication can be at the storage layer, volume group replication through AOS DR. In some embodiments, PVC is attached to existing volume groups. In some embodiments, access keys provided to users. As part of replicating data, keys can be replicated.

In some embodiments, each of the components in the object store cluster 200, the source object store cluster 501, and the target object store cluster 502, are services on one or more object virtual machines (OVMs) such as the OVMs 111A-B, 112A-B, and 113A-B of FIG. 1. In some embodiments, each OVM is dedicated to one service (e.g., the object controller 201 runs on the OVM 111A, the metadata service 202 runs on the OVM 111B, the storage structure 203 runs on the OVM 112A, and the I/O manager 503 runs on the OVM 112B. In some embodiments, one or more of the components in the object store cluster 200 are distributed across multiple OVMs (e.g., the storage structure 203 runs on the OVM 112A and the OVM 113A). In some embodiments, more greater or less than three components/services/OVMs are included in an object store cluster such as the object store cluster 200, the source object store cluster 501, and the target object store cluster 502.

Each of the elements or entities of the virtual computing system 100 and the multi-cluster storage system 200 (e.g., The object store cluster 200 the object controller 201, the metadata service 202, the storage structure 203, the I/O manager 503, the OSS1, and the MCC1), is implemented using hardware, software, or a combination of hardware or software, in one or more embodiments. The elements or entities of the virtual computing system 100 and the multi-cluster storage system 200 can include any application, program, library, script, task, service, process or any type and form of executable instructions executed by one or more processors (e.g., the CPU 130A), in one or more embodiments. Each of the one or more processors is hardware. The instructions may be stored on one or more computer readable and/or executable storage media including non-transitory storage media such as non-transitory storage media in the storage pool 140 with respect to FIG. 1.

Figure 10:
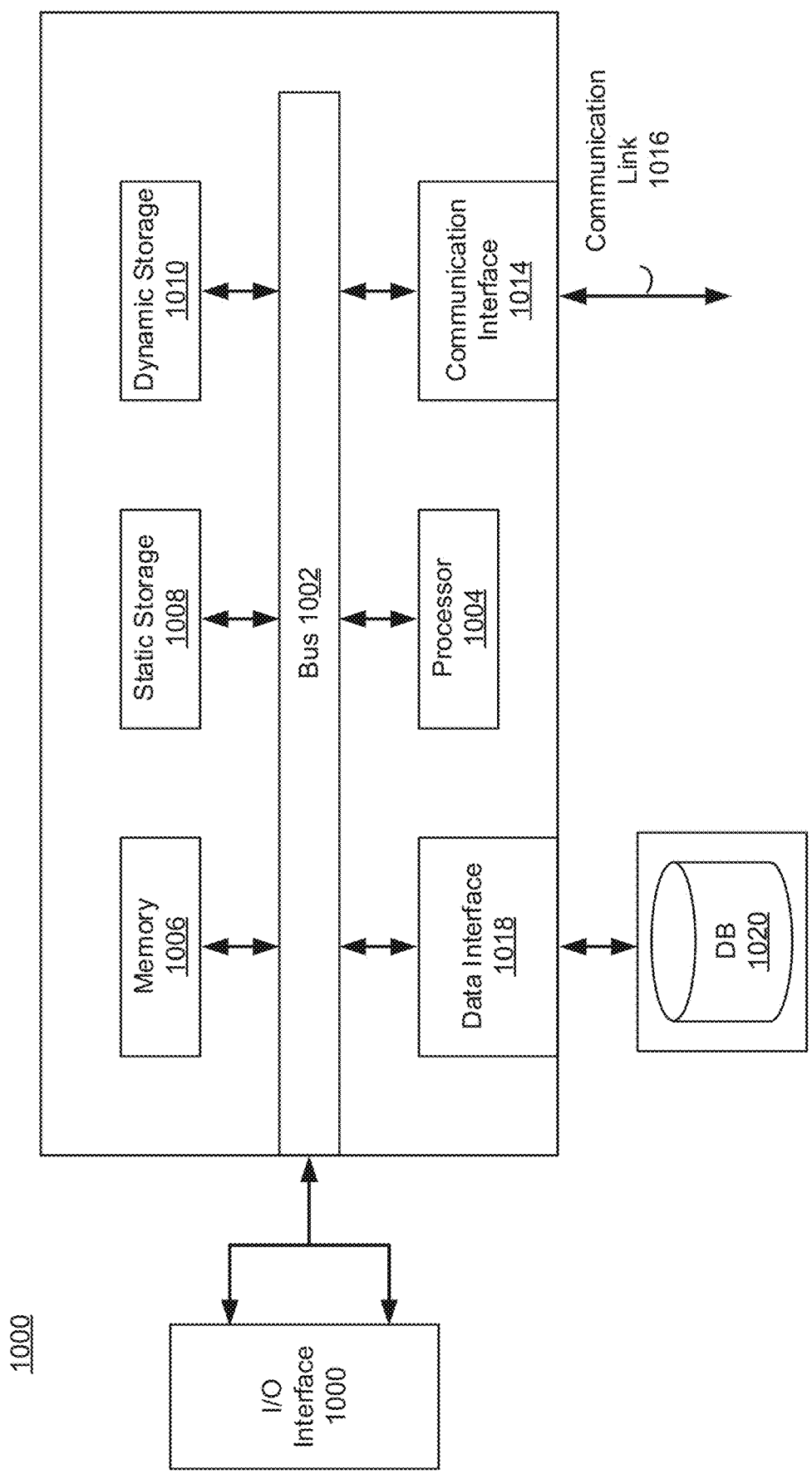
FIG. 10 illustrates a block diagram of a computing system suitable for implementing particular embodiments disclosed herein.

Referring to FIG. 10, illustrated is a block diagram of an illustrative computing system 1000 suitable for implementing particular embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa. Moreover, reference to a computer system may encompass one or more computer systems.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Computer system 1000 may include one or more computer systems 1000; be unitary or distributed; span multiple locations; span multiple machines; span multiple data centers; or reside in a cloud, which may include one or more cloud components in one or more networks. One or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein.

In some embodiments, the computer system 1000 includes a bus 1002 (e.g., an address bus and a data bus) or other communication mechanism for communicating information, which interconnects subsystems and devices, such as processor 1004, memory 1006 (e.g., RAM), static storage 1008 (e.g., ROM), dynamic storage 1010 (e.g., magnetic or optical), communication interface 1014 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 1012 (e.g., keyboard, keypad, mouse, microphone). In particular embodiments, computer system 1000 may include one or more of any such components.

In particular embodiments, processor 1004 includes hardware for executing instructions, such as those making up a computer program. Each of the components in FIGS. 1-9 (e.g., The object store cluster 200 the object controller 201, the metadata service 202, the storage structure 203, the I/O manager 503, the OSS1, and the MCC1) comprise, are coupled to, or are otherwise associated with a (shared or dedicated) processor such as the processor 1004. As an example and not by way of limitation, to execute instructions, processor 1004 may retrieve (or fetch) the instructions from an internal register, an internal cache, memory 1006, static storage 1008, or dynamic storage 1010; decode and execute them; and then write one or more results to an internal register, an internal cache, memory 1006, static storage 1008, or dynamic storage 1010. In particular embodiments, processor 1004 may include one or more internal caches for data, instructions, or addresses. This disclosure contemplates processor 1004 including any suitable number of any suitable internal caches. As an example and not by way of limitation, processor 1004 may include one or more instruction caches, one or more data caches, and one or more translation lookaside buffers (TLBs). Instructions in the instruction caches may be copies of instructions in memory 1006, static storage 1008, or dynamic storage 1010, and the instruction caches may speed up retrieval of those instructions by processor 1004. Data in the data caches may be copies of data in memory 1006, static storage 1008, or dynamic storage 1010 for instructions executing at processor 1004 to operate on; the results of previous instructions executed at processor 1004 for access by subsequent instructions executing at processor 1004 or for writing to memory 1006, static storage 1008, or dynamic storage 1010; or other suitable data. The data caches may speed up read or write operations by processor 1004. The TLBs may speed up virtual-address translation for processor 1004. In particular embodiments, processor 1004 may include one or more internal registers for data, instructions, or addresses. This disclosure contemplates processor 1004 including any suitable number of any suitable internal registers. Processor 1004 may include one or more arithmetic logic units (ALUs); be a multi-core processor; or include one or more processors 1004. Although this disclosure describes and illustrates a particular processor, this disclosure contemplates any suitable processor.

In particular embodiments, I/O interface 1012 includes hardware, software, or both, providing one or more interfaces for communication between computer system 1000 and one or more I/O devices. Computer system 1000 may include one or more of these I/O devices. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1012 for them. I/O interface 1012 may include one or more device or software drivers enabling processor 1004 to drive one or more of these I/O devices. I/O interface 1012 may include one or more I/O interfaces 1012. Although this disclosure describes and illustrates a particular I/O interface, this disclosure contemplates any suitable I/O interface.

In particular embodiments, communication interface 1014 includes hardware, software, or both providing one or more interfaces for communication (such as, for example, packet-based communication) between computer system 1000 and one or more other computer systems 1000 or one or more networks. As an example and not by way of limitation, communication interface 1014 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1014 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1014 for any of these networks. Communication interface 1014 may include one or more communication interfaces 1014. Although this disclosure describes and illustrates a particular communication interface, this disclosure contemplates any suitable communication interface.

One or more memory buses (which may each include an address bus and a data bus) may couple processor 1004 to memory 1006. Bus 1002 may include one or more memory buses, as described below. In particular embodiments, one or more memory management units (MMUs) reside between processor 1004 and memory 1006 and facilitate accesses to memory 1006 requested by processor 1004. In particular embodiments, memory 1006 includes random access memory (RAM). This RAM may be volatile memory, dynamic RAM (DRAM) or static RAM (SRAM). Moreover, this RAM may be single-ported or multi-ported RAM. This disclosure contemplates any suitable RAM. Memory 1006 may include one or more memories 1006. Although this disclosure describes and illustrates particular memory, this disclosure contemplates any suitable memory.

The ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 1010 may include a hard disk drive (HDD), a floppy disk drive, flash memory, an optical disc, a magneto-optical disc, magnetic tape, or a Universal Serial Bus (USB) drive or a combination of two or more of these. Dynamic storage 1010 may include removable or non-removable (or fixed) media. Dynamic storage 1010 may be internal or external to computer system 1000. This disclosure contemplates mass dynamic storage 1010 taking any suitable physical form. Dynamic storage 1010 may include one or more storage control units facilitating communication between processor 1004 and dynamic storage 1010.

In particular embodiments, bus 1002 includes hardware, software, or both coupling components of computer system 1000 to each other. As an example and not by way of limitation, bus 1002 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1002 may include one or more buses. Although this disclosure describes and illustrates a particular bus, this disclosure contemplates any suitable bus or interconnects.

In some embodiments, computer system 1000 performs specific operations by processor 1004 executing one or more sequences of one or more instructions contained in memory 1006. Such instructions may be read into memory 1006 from another computer readable/usable medium, such as static storage 1008 or dynamic storage 1010. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 1004 for execution. Such a medium may take many forms, including but not limited to, nonvolatile media and volatile media. Non-volatile media includes, for example, optical or magnetic disks, such as static storage 1008 or dynamic storage 1010. Volatile media includes dynamic memory, such as memory 1006.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 1000; in alternative embodiments, two or more computer systems 1000 coupled by communication link 1016 (e.g., LAN, PTSN, or wireless network) may perform the sequence of instructions in coordination with one another.

Computer system 1000 may transmit and receive messages, data, and instructions, including program, i.e., application code, through communication link 1016 and communication interface 1014. Received program code may be executed by processor 1004 as it is received, and/or stored in static storage 1008 or dynamic storage 1010, or other non-volatile storage for later execution. A database 1020 may be used to store data accessible by the system 1000 by way of data interface 1018.

Herein, a non-transitory computer readable medium (also referred to as "computer-readable non-transitory storage medium") includes instructions, when executed, cause a processor to execute various functionalities described herein. In some embodiments, a computer-readable non-transitory storage medium or media may be embodied as one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, the memory comprising programmed instructions that, when executed by the processor, cause the apparatus to:
   store, in a first cluster of host machines, an object, object information metadata of the object and object replication metadata of the object in a database;
   scan the database to identify the object replication metadata;
   in response to the object replication metadata indicating to replicate the object, replicate the object and the object information metadata to a second cluster of host machines;
   update the object; and
   in response to updating the object, update the object replication metadata to indicate that the updated object is to be replicated to the second cluster.

2. The apparatus of claim 1, wherein the first cluster is in a first geographic region, and wherein the second cluster is in a second geographic region different from the first geographic region.

3. The apparatus of claim 1, the memory comprising the programmed instructions that, when executed by the processor, further cause the apparatus to replicate the object information metadata to the storage of the second cluster.

4. The apparatus of claim 3, the memory comprising the programmed instructions that, when executed by the processor, further cause the apparatus to delete the object replication metadata, responsive to replicating the object information metadata to the storage of the second cluster.

5. The apparatus of claim 1, the memory comprising the programmed instructions that, when executed by the processor, further cause the apparatus to replicate the object information metadata from a first bucket in the first cluster to a second bucket in the second cluster.

6. The apparatus of claim 1, wherein a first duration of the object information metadata is greater than a second duration of the object replication metadata.

7. A non-transitory computer readable storage medium comprising instructions stored thereon, when executed by a processor, cause the processor to:
  store, in a first clusterof host machines, an object, object information metadata of the object and object replication metadata of the object in a database;
  scan the database to identify the object replication metadata;
  in response to the object replication metadata indicating to replicate the object, replicate the object and the object information metadata to a second cluster of host machines;
  update the object; and
  in response to updating the object, update the object replication metadata to indicate that the updated object is to be replicated to the second cluster.

8. The medium of claim 7, wherein the first cluster is in a first geographic region, and wherein the second cluster is in a second geographic region different from the first geographic region.

9. The medium of claim 7, further comprising instructions, when executed by the processor, cause the processor to replicate the object information metadata to the storage of the second cluster.

10. The medium of claim 9, further comprising instructions, when executed by the processor, cause the processor to delete the object replication metadata, responsive to replicating the object information metadata to the storage of the second cluster.

11. The medium of claim 7, further comprising instructions, when executed by the processor, cause the processor to replicate the object information metadata from a first bucket in the first cluster to a second bucket in the second cluster.

12. The medium of claim 7, wherein a first duration of the object information metadata is greater than a second duration of the object replication metadata.

13. A computer-implemented method comprising:
  storing, in a first cluster of host machines, an object, object information metadata of the object and object replication metadata of the object in a database;
  scanning the database to identify the object replication metadata;
  in response to the object replication metadata indicating to replicate the object, replicating, by the processor, the object and the object information metadata to a second cluster of host machines;
  updating the object; and
  in response to updating the object updating the object replication metadata to indicate that the object is to the replicated to the second cluster.

14. The method of claim 13, wherein the first cluster is in a first geographic region, and wherein the second cluster is in a second geographic region different from the first geographic region.

15. The method of claim 13, further comprising replicating the object information metadata to the storage of the second cluster.

16. The method of claim 15, further comprising deleting the object replication metadata, responsive to replicating the object information metadata to the storage of the second cluster.

17. The method of claim 13, wherein a first duration of the object information metadata is greater than a second duration of the object replication metadata.

18. The apparatus of claim 1, the memory comprising the programmed instructions that, when executed by the processor, further cause the apparatus to read the object information metadata and the object replication metadata from the LSM database using a same key.

19. The medium of claim 7, further comprising instructions, when executed by the processor, cause the processor to read the object information metadata and the object replication metadata from the LSM database using a same key.

20. The method of claim 13, further comprising reading the object information metadata and the object replication metadata from the LSM database using a same key.

21. The apparatus of claim 1, the memory comprising the programmed instructions that, when executed by the processor, further cause the apparatus to:
  write the object information metadata and the object replication metadata to a log- structured merge (LSM) database of the first cluster;
  in response to writing the object, to the storage of the first cluster of host machines, scan the LSM database to identify the object replication metadata; and
  in response to identifying the object replication metadata, write to the object replication metadata to indicate that the object is to be replicated.

22. The medium of claim 7, further comprising instructions, when executed by the processor, cause the processor to:
  write the object information metadata and the object replication metadata to a log- structured merge (LSM) database of the first cluster;
  in response to writing the object,. to the storage of the first cluster of host machines, scan the LSM database to identify the object replication metadata; and
  in response to identifying the object replication metadata, write to the object replication metadata to indicate that the object is to be replicated.

23. The method of claim 13, further comprising writing the object information metadata and the object replication metadata to a log- structured merge (LSM) database of the first cluster;
  in response to writing the object to the storage of the first cluster of host machines, scanning the LSM database to identify the object replication metadata; and
  in response to identifying the object replication metadata, writing to the object replication metadata to indicate that the object is to be replicated.

* * * * *